Oct. 3, 1939.   C. M. HAYNES   2,174,511
REPAIR DEVICE FOR SPECTACLE AND EYEGLASS LENSES
Filed March 17, 1938   2 Sheets-Sheet 2
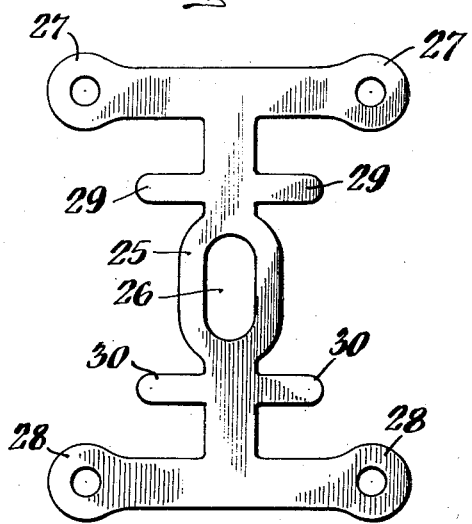
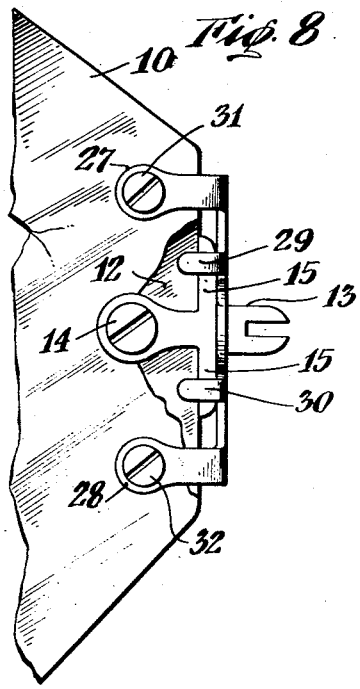
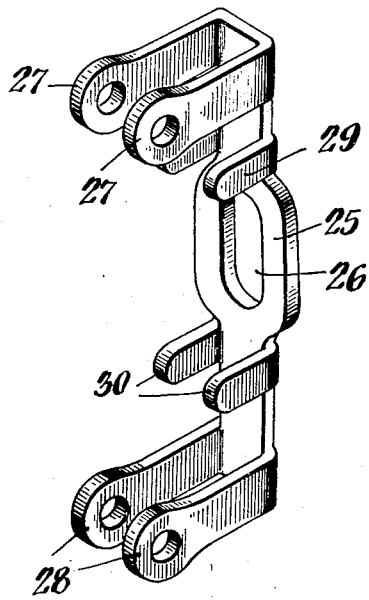
INVENTOR
Charles M. Haynes
BY
Cooper Kerr & Dunham
ATTORNEYS Patented Oct. 3, 1939

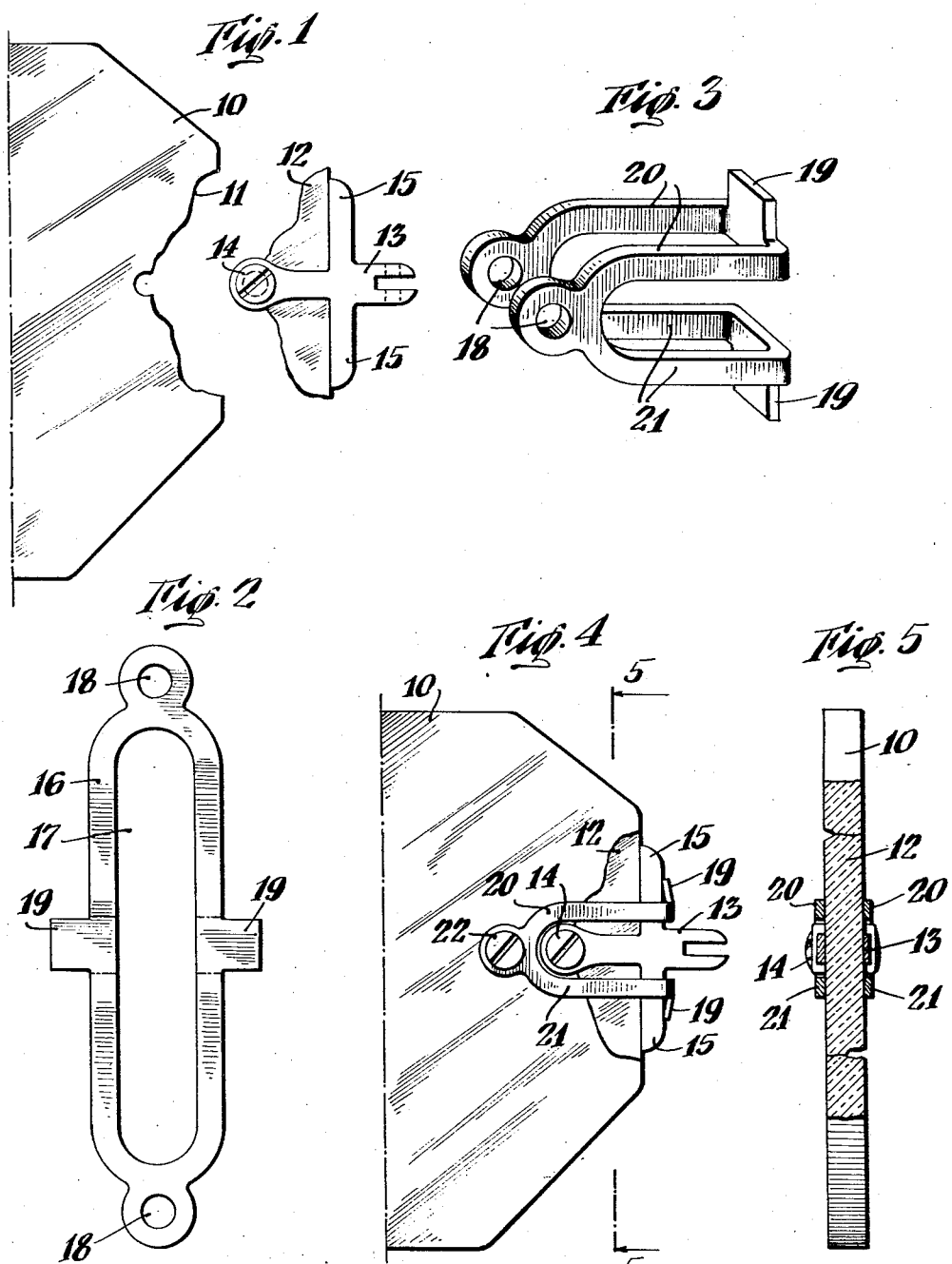

2,174,511

UNITED STATES PATENT OFFICE 2,174,511

REPAIR DEVICE FOR SPECTACLE AND EYEGLASS LENSES

Charles Martin Haynes, Chillicothe, Ohio

Application March 17, 1938, Serial No. 196,332

8 Claims. (Cl. 88—47)

This invention relates to devices for the repair of broken lenses in eyeglasses and spectacles of the "rimless" type. In spectacles and eyeglasses of that type the lens mounting comprises a piece formed with arms which fit over and embrace the edge of the lens and are fastened by a screw or rivet through a hole in the lens. This hole weakens the lens, with the result that breakage often occurs through the hole, the break usually being in the form of a more or less V-shaped notch. The mounting piece is equipped with fingers extending upwardly and downwardly from the aforesaid arms and bearing snugly on the lens edge to prevent the mounting from rocking in the plane of the lens. When breakage of the kind referred to occurs the piece broken out of the lens, roughly triangular in shape, is in most cases still held in the mounting piece, and in the use of prior repair devices this broken-out piece of the lens is removed from the mounting piece, the result being that when the repair device and the mounting piece are assembled on the lens a hole is left in the latter which increases the likelihood of rebreakage, by catching the hole on a pointed object, say a pencil as the glasses are picked up from the table or desk, or as they are placed on a hook on the user's garment. It is accordingly an object of the present invention to provide a repair device which will make it unnecessary to remove the broken part of the lens from the end piece but will permit the broken part to be replaced and firmly held in its original position relative to the body of the lens in making the repair, thus closing the break in the lens and restoring the glasses more nearly to their original condition. Another object is to provide a repair device which locates the end piece or mounting in its original position, thus simplifying the repair job by making it unnecessary for the optician to readjust the nose clips, bridge, or temple pieces, in order to restore the glasses to the proper position before the eyes. A further object is to provide a repair device such that if through inadvertence or lack of care the assembly of the parts leaves the end piece loose or "shaky" the necessary tightening can be effected by slight bending adjustment of the repair device. To these and other ends the invention comprises the novel features and combinations hereinafter described.

The nature of the invention as preferably constructed and used will be more readily understood in connection with the accompanying drawings, in which—

Fig. 1 illustrates a rimless lens 10 having a V-shaped break 11 with the broken part 12 held in the end piece or mounting 13 between the screw 14 and the fingers 15.

Fig. 2 illustrates one form of my repair device 5 which can be made by stamping it out of sheet metal, and Fig. 3 shows the device as shaped for use.

Fig. 4 shows the device applied to the broken lens, with the mounting piece 13, and broken piece 12 of the lens, restored to their original position.

Fig. 5 is a section on line 5—5 of Fig. 4

Fig. 6 illustrates a sheet metal blank for another form of the invention.

Fig. 7 illustrates a form of the invention produced by bending the blank shown in Fig. 6.

Fig. 8 illustrates the use of the form shown in Fig. 7.

The repair device 16 shown in Fig. 2 is elongated in form and is provided with a longitudinal slot 17 and with holes 18 at its ends to receive the screw by which the device is fastened to the lens in making the repair, as hereinafter explained. Midway between its ends the device is equipped with integral lugs or fingers 19 extending laterally in opposite directions.

For use the device illustrated in Fig. 2 is bent transversely, at or near the lugs 19, to the U-shape shown in perspective in Fig. 3, forming spaced upper arms 20 and spaced lower arms 21. In applying the device to make the desired repair the optician fits the broken piece 12, Fig. 1, with the attached outwardly extending mounting-piece 13, back into place, and slips the repair device over the broken piece of the lens and over the mounting piece 13, the latter protruding outwardly between the arms 20—20 and 21—21, as indicated in Fig. 4. He then marks the lens at the point where the hole for the fastening screw is to be drilled. Removing the parts, he drills the hole, reassembles the parts, and inserts the screw 22, one of the holes 18, Figs. 2 and 3, being threaded for the purpose. The repair device is thus secured to the body of the lens by means common to the two pairs of arms 20, 21. It is desirable to have the arms 20—20 and 21—21 bear snugly on the opposite surfaces of the glass, but lenses vary in thickness and in the curvature of their optical surfaces and hence in some cases it may be necessary to bend the arms more or less to obtain the desired snug fit, and of course this adjustment is made before the position of the hole in the lens is determined. In any case it may happen that the lens hole is too large, or too near the break in the lens, and hence when the parts are assembled the broken piece 12 and end piece 13 may be loose. If so the fitting of these parts can be made as tight as desired by bending the lugs or fingers 19 inwardly into firm contact with the mounting piece fingers 15, as indicated in Fig. 4. Or the hole for the screw 22 may be slightly too high or too low, in which case the inaccuracy of the position of the hole can be corrected and the repair assembly tightened by proper bending adjustment of the fingers 19. Similarly, if the hole in the lens is too far from the edge of the lens it can be reamed out to a larger size or elongated horizontally, the fingers 19 being then bent to take up any shake resulting from too great enlargement or elongation of the hole.

Another form of the invention is illustrated in Figs. 6, 7 and 8. In this form the repair device 25, Fig. 6, is provided at its ends with apertured arms 27, 28 which for use in making a repair are bent in the same direction into parallelism with each other as in Fig. 7. Between its ends the device is provided with an opening 26. In making a repair the parts are assembled as illustrated in Fig. 8, with the outer part of the mounting or end piece 13 protruding through the slot 26. With this device two holes in the lens are necessary, for the screws 31, 32, by which the pairs of arms 27, 28 are secured separately to the body of the lens. The effect of inaccurate positioning of the holes can be eliminated by suitable bending of the body of the device, between the arms 27, 28. Rocking movement of the device (toward or from the observer, Fig. 8) is prevented by the firm grip of the arms 27, 28 on the lens above and below the break, and this in turn prevents like movement of the mounting piece 13 on the sides of which the sides of the slot 26 bear snugly, these sides being bent toward each other if necessary to produce the necessary firm pressure thereof upon the end piece.

The repair device may be provided with lugs 29, 30 between the opening 26 and the arms 27, 28. When bent laterally in the same direction as the arms mentioned the lugs embrace the outer edge of the broken piece 12 and thus hold the latter more firmly in place.

It is to be understood that the invention is not limited to the specific constructions herein illustrated but can be embodied in other forms without departing from its spirit as defined by the appended claims. For example I have shown the repair device as shaped for use with a lens having straight side edges but the device can, of course, be shaped for use with a lens having curved side edges.

I claim:

1. The combination with a lens and a mounting therefor of the rimless type, the lens having a piece broken out at the lens-mounting, the latter provided with arms embracing and holding the broken-out piece; of a repair device embracing the lens-mounting and having arms extending inwardly upon the body of the lens, whereby to hold the lens-mounting and the broken-out piece in their original positions relative to the body of the lens; and means displaced from the break to secure the said arms of the repair device to the body of the lens.

2. The combination with a lens and a mounting therefor of the rimless type, the lens having a piece broken out at the lens-mounting, the latter provided with arms embracing the broken-out piece; of a repair device embracing the mounting and having pairs of arms extending inwardly upon the body of the lens and the repair device having between said pairs of arms an opening through which the lens-mounting extends outwardly from the broken-out piece, whereby to hold the lens-mounting and the broken-out piece in their original positions relative to the body of the lens; and means displaced from the break and common to said pairs of arms to secure the same to the body of the lens.

3. The combination with a lens and a mounting therefor of the rimless type, the lens having a piece broken out at the lens-mounting, the latter provided with arms embracing and holding the broken-out piece and with upwardly and downwardly extending fingers bearing on the outer edge of said broken-out piece; of a repair device embracing the lens-mounting and having arms extending inwardly upon the body of the lens, the repair device also having upwardly and downwardly extending lugs bearing on the said fingers of the mounting piece, whereby to hold the lens-mounting and the broken-out piece in their original positions relative to the body of the lens; and means displaced from the break to secure the said arms of the repair device to the body of the lens.

4. The combination with a lens and a mounting therefor of the rimless type, the lens having a piece broken out at the lens-mounting, the latter provided with arms embracing and holding the broken-out piece; of a repair device having upper and lower pairs of arms extending inwardly across the broken-out piece and upon the lens body for securement to the latter, and the repair device having between said pairs of arms an opening through which the lens-mounting extends outwardly from the broken-out piece, whereby to hold the lens-mounting and the broken-out piece in their original positions relative to the body of the lens; and means displaced from the break to secure the said arms of the repair device to the lens body.

5. The combination with a lens and a mounting therefor of the rimless type, the lens having a piece broken out at the lens-mounting, the latter provided with arms embracing and holding the broken-out piece; of a repair device embracing the mounting and having pairs of arms embracing the body of the lens at points above and below the mounting and the repair device having an opening through which the lens-mounting extends outwardly from the broken-out piece, whereby to hold the lens-mounting and the broken-out piece in their original positions relative to the body of the lens; and means displaced from the break to secure the said pairs of arms of the repair device separately to the body of the lens.

6. The combination with a lens and a mounting therefor of the rimless type, the lens having a piece broken out at the lens-mounting, the latter provided with arms embracing and holding the broken-out piece and with fingers bearing on the outer edge of said piece; of a repair device bearing upon the said fingers above and below the lens-mounting and having pairs of arms embracing the edge of the body of the lens at points above and below the broken-out piece and the repair device having an opening through which the lens-mounting extends outwardly from the broken-out piece, whereby to hold the lens-mounting and the broken-out piece in their original positions relative to the body of the lens; and means displaced from the break to secure the said arms of the repair device to the body of the lens.

7. A device adapted for the repair of a broken lens of the rimless mounting type by restoring and holding in their original positions the mounting and a piece broken out of the lens through a hole originally employed for fastening the mounting to the unbroken lens, the device comprising a member having between its ends an opening enabling the device to be passed over the part of the mounting which projects outwardly from the broken piece, said member bendable between its ends to provide arms adapted to embrace the broken piece and extend over and past the same and having means for securement to the lens body at a point beyond said hole.

8. A device adapted for the repair of a broken lens of the rimless mounting type by restoring and holding in their original positions the mounting and a piece broken out of the lens through a hole originally employed for fastening the mounting to the unbroken lens, the device comprising a member having between its ends an opening enabling the device to be passed over the part of the mounting which projects outwardly from the broken piece, and said member having at its ends laterally extending arms bendable to embrace the edge of the lens body above and below the break and having means for securement to the lens body at points displaced from the break.

CHARLES MARTIN HAYNES.